(12) United States Patent
Vo et al.

(10) Patent No.: US 10,259,990 B2
(45) Date of Patent: Apr. 16, 2019

(54) FRACTURING FLUID

(71) Applicant: HALLIBURTON ENERGY SERVICES, INC., Houston, TX (US)

(72) Inventors: Loan K. Vo, Houston, TX (US); Bradley J. Sparks, Richmond, TX (US); Corneliu Stanciu, Kingwood, TX (US); Christopher Parton, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 102 days.

(21) Appl. No.: 15/102,488

(22) PCT Filed: Jan. 9, 2014

(86) PCT No.: PCT/US2014/010796
§ 371 (c)(1),
(2) Date: Jun. 7, 2016

(87) PCT Pub. No.: WO2015/105491
PCT Pub. Date: Jul. 16, 2015

(65) Prior Publication Data
US 2016/0312110 A1 Oct. 27, 2016

(51) Int. Cl.
*C09K 8/68* (2006.01)
*C09K 8/90* (2006.01)
(Continued)

(52) U.S. Cl.
CPC ............. *C09K 8/685* (2013.01); *C09K 8/602* (2013.01); *C09K 8/605* (2013.01); *C09K 8/887* (2013.01);
(Continued)

(58) Field of Classification Search
None
See application file for complete search history.

(56) References Cited

U.S. PATENT DOCUMENTS 4,096,326 A * 6/1978 Reid ....................... C06B 47/14
536/95
4,961,466 A 10/1990 Himes et al.
(Continued)

FOREIGN PATENT DOCUMENTS

EP 0347975 A2 12/1989

OTHER PUBLICATIONS

Copenheaver, PCT Search Report for PCT Application No. PCT/US2014/010796 dated Apr. 24, 2014.
(Continued)

*Primary Examiner* — Jeffrey D Washville
(74) *Attorney, Agent, or Firm* — Locke Lord LLP

(57) ABSTRACT

A fracturing fluid and method of including a cellulose polymer derivative, a diol functional group, and a borate crosslinker. The diol functional group may be a cis-diol functional group, a 1,2-diol functional group, or a 1,3-diol functional group. The cellulose polymer derivative further may include a hydroxyethyl group or a hydroxypropyl group. The fracturing fluid may also include at least one metallic crosslinker. The method may also include the steps of adding a pH adjusting agent, at least one breaker, a surfactant, a scale inhibitor, and/or a bactericide to the fracturing fluid, or mixing the fracturing fluid using mixing equipment or wherein the fracturing fluid is introduced into a subterranean formation using one or more pumps.

14 Claims, 2 Drawing Sheets

(51) Int. Cl.
*C09K 8/88* (2006.01)
*C09K 8/60* (2006.01)

(52) U.S. Cl.
CPC ............ *C09K 8/90* (2013.01); *C09K 2208/24* (2013.01); *C09K 2208/26* (2013.01)

(56) References Cited

U.S. PATENT DOCUMENTS

| | | |
|---|---|---|
| 2006/0196662 A1 | 9/2006 | Hanes, Jr. et al. |
| 2014/0262276 A1* | 9/2014 | Li .................. C09K 8/685 166/300 |

OTHER PUBLICATIONS

Copenheaver, PCT Written Opinion for PCT Application No. PCT/US2014/010796 dated Apr. 24, 2014.
Ooi, T., Uraguchi, D., Kagoshima, N., Maruoka, K., "Hypercoordination of Boron and Aluminum: Synthetic Utility as Chelating Lewis Acids," J. Am. Chem. Soc. 1998, 120, 5327-5327.

* cited by examiner

FRACTURING FLUID

FIELD OF INVENTION

The embodiments disclosed herein relate generally to methods and compositions for fracturing fluids for use in oilfield applications.

BACKGROUND OF INVENTION

Within the fracturing fluid industry, guar based fluids or borate crosslinked guar fluids have historically been used. The use of borate crosslinked fluid is established in the fracturing fluid industry due to its reliability, economics, ease of use, and predictability for crosslinked frac fluid.

Guar is a galactomannan polysaccharide. It is known that the crosslinking mechanism of guar based fluid with borate crosslinker is via the cis-diol functional group possessed by the mannose and galactose moieties of guar.

Other fracturing fluids used in the industry such as carboxymethyl cellulose (CMC) or carboxymethyl hydroxyethyl cellulose (CMHEC) are cellulose derivatives. These polymers do not possess the cis-diol functional group either on their polymer backbone or on derivatives thereof. These polymers are typically crosslinked with transition or main group metals such as Al, Mg, Zr, Ti, Cu, Mo, or Co to generate the crosslinked fluid network. However the polymers currently use metallic crosslinkers which lack the rehealability as a desirable characteristic that borate crosslinked fluids possess.

By providing methods to synthesize new cellulose based polymers that are able to crosslink with borate crosslinker, the present invention offers cellulose derivative polymers that can gain the rehealability characteristic, coupled with great clean-up ability.

DETAILED DESCRIPTION OF DISCLOSED EMBODIMENTS

Figure 1:
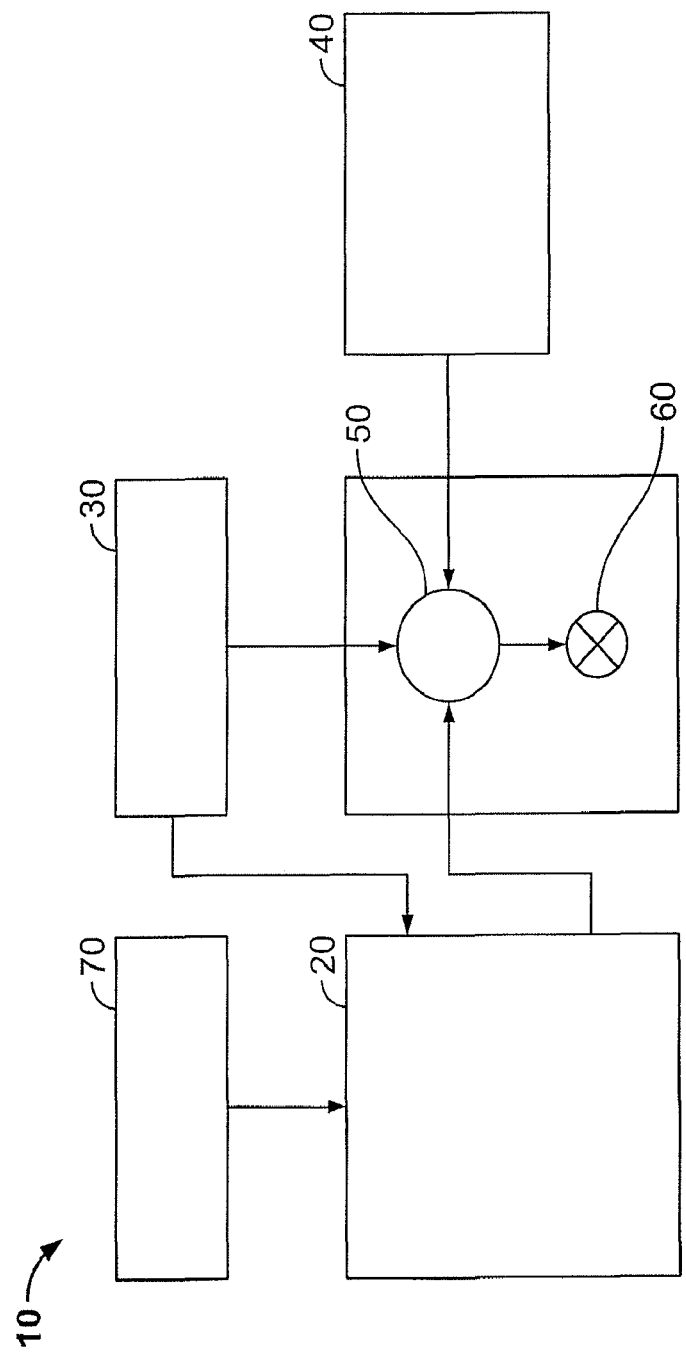
FIG. 1 is a diagram illustrating an example of a fracturing system that may be used in accordance with certain embodiments of the present disclosure.

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time.

While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Cellulose derivatives such as CMC or CMHEC are known to essentially yield minimal or zero insoluble residue upon breaking This leads to improved cleanup and enhanced proppant pack, sand pack, and core regained permeability, which ultimately leads to enhanced oil and gas production from stimulation treatments.

However the polymers tend to suffer from instability upon high shear due to the nonrehealability of metal crosslinked polymer. This invention disclosure provides new methods to derivatize cellulose with cis-diol functional groups to lend it the capability to be crosslinked with borate crosslinker. The following disclosure discloses different mechanisms of generating cellulose derivatized with cis-diol functional groups.

Embodiment 1 shows cellulose polymer is derivatized with cis-diol functional group 'locked' in a cyclic structure such as cyclopentadiol as shown in the reactions displayed at Compounds 1-3 in Embodiment 1.

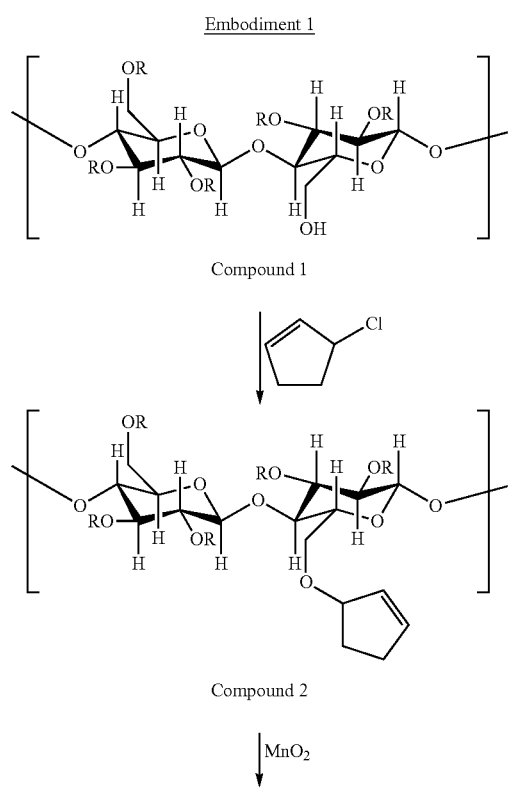

3
-continued

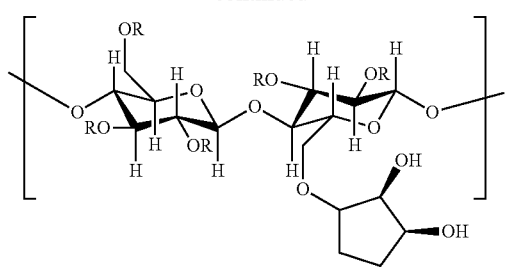

Compound 3

In another embodiment, cellulose polymer is derivatized with hydroxyethyl group followed by functionalizing with cis-diol groups 'locked' in a cyclic structure such as cyclopentadiol.

Embodiment 2

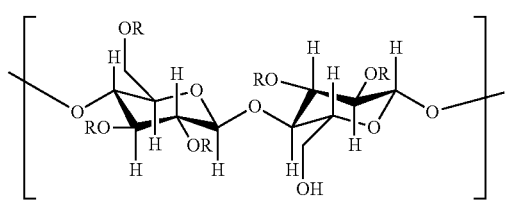

Compound 4

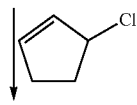

4
-continued

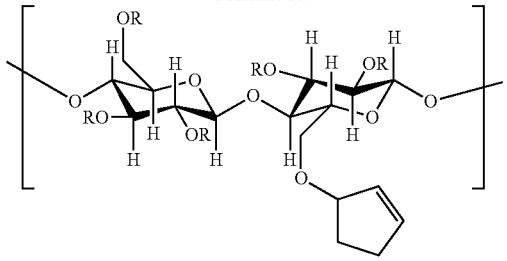

Compound 5

 MnO$_2$

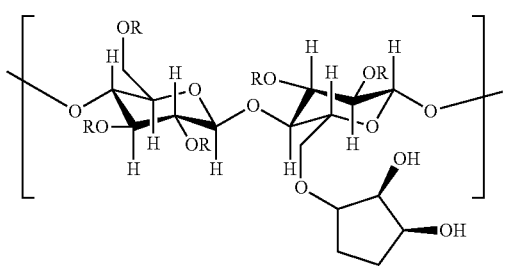

Compound 6

In Embodiment 2, cellulose polymer can be derivatized with 1,2-diol functional group shown in the mechanism by Compounds 4-6. The diol functional group may not necessarily be pre-locked in a cis conformation; however, due to the oxophilicity of boron in the borate species and the free rotation of the C—C single bond, complex formation between the diols and borate species occurs.

Embodiment 3

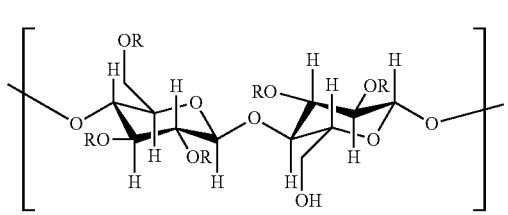

Compound 7/8

$\xrightarrow{\text{HO}\diagup\diagdown\text{OH}}{\text{Basic Conditions}}$

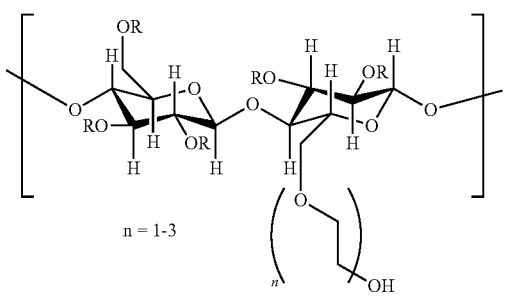

n = 1-3

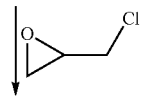

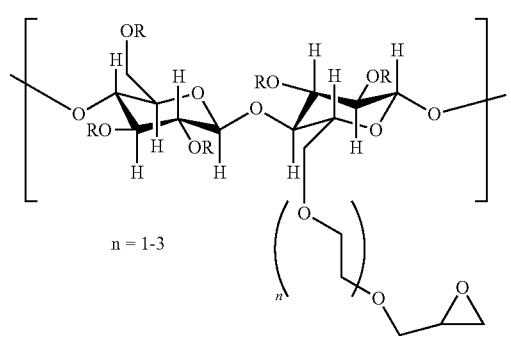 and/or 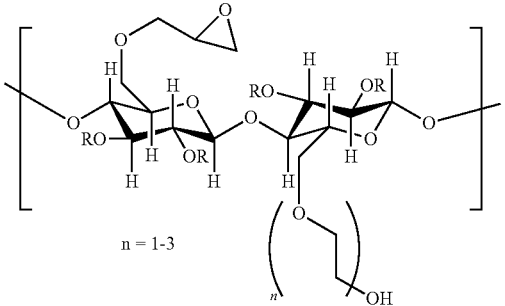

Compound 9/10

$$\Big\downarrow \begin{array}{c} H_2O \\ NaOH \end{array}$$

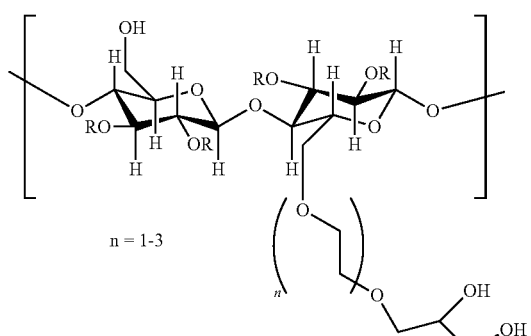 and/or 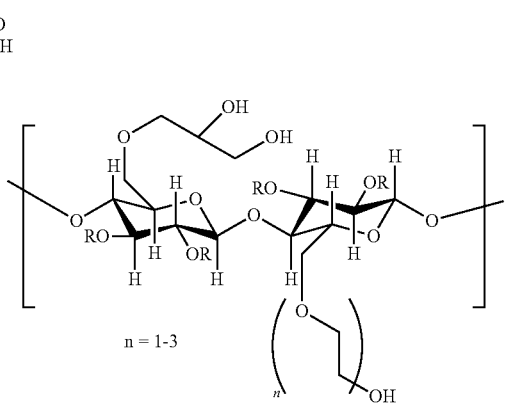

Compound 11/12

In Embodiment 3, cellulose polymer is derivatized with hydroxyethyl group followed by functionalizing with diol group as shown by Compounds 7-12. Diol groups can be placed on the hydroxyethyl group or off of the hydroxyl group from the glucose backbone shown in Embodiment 3.

In another embodiment, cellulose polymer can be derivatized with 1,3-diol functional group instead of 1,2-diol functional group, or the mixture of.

In another embodiment, cellulose polymer can be derivatized with carboxymethyl group together with diol group to allow it the versatility of being crosslinked with metallic as well as borate crosslinkers.

In another embodiment, composition of the fracturing fluid into the subterranean formation comprises the new borate crosslinkable cellulose polymer, borate crosslinker, pH adjusting agent, breakers, surfactant, scale inhibitor, and bactericide.

The present invention allows cellulose based polymers to be able to crosslink with borate, which lends them the rehealable characteristic many fluids desire. Moreover, the present invention enhances the capability of cellulose derivative polymers being a residue free polymer with great shear stability due to their rehealability. Furthermore, the present invention expands the application of cellulose derived polymers beyond the limited array of metallic crosslinkers.

A fracturing fluid including a cellulose polymer derivative, a diol functional group, and a borate crosslinker. The diol functional group may be a cis-diol functional group, a 1,2-diol functional group, or a 1,3-diol functional group. The cellulose polymer derivative further may include a hydroxyethyl group or a hydroxypropyl group. The fracturing fluid may also include at least one metallic crosslinker. The metallic cross linker may be Al, Mg, Zr, Ti, Cu, Mo, or Co.

A method of using a fracturing fluid which includes the step of introducing the fracturing fluid into a subterranean formation, wherein the fracturing fluid includes a cellulose polymer derivative, a diol functional group, and a borate crosslinker. The diol functional group may be a cis-diol functional group, a 1,2-diol functional group, or a 1,3-diol functional group. The cellulose polymer derivative further may include a hydroxyethyl group or hydroxypropyl group. The fracturing fluid may also include at least one metallic crosslinker. The metallic crosslinker may be Al, Mg, Zr, Ti, Cu, Mo, or Co. The method may also include the steps of adding a pH adjusting agent, at least one breaker, a surfactant, a scale inhibitor, and/or a bactericide to the fracturing fluid, or mixing the fracturing fluid using mixing equipment or wherein the fracturing fluid is introduced into a subterranean formation using one or more pumps.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
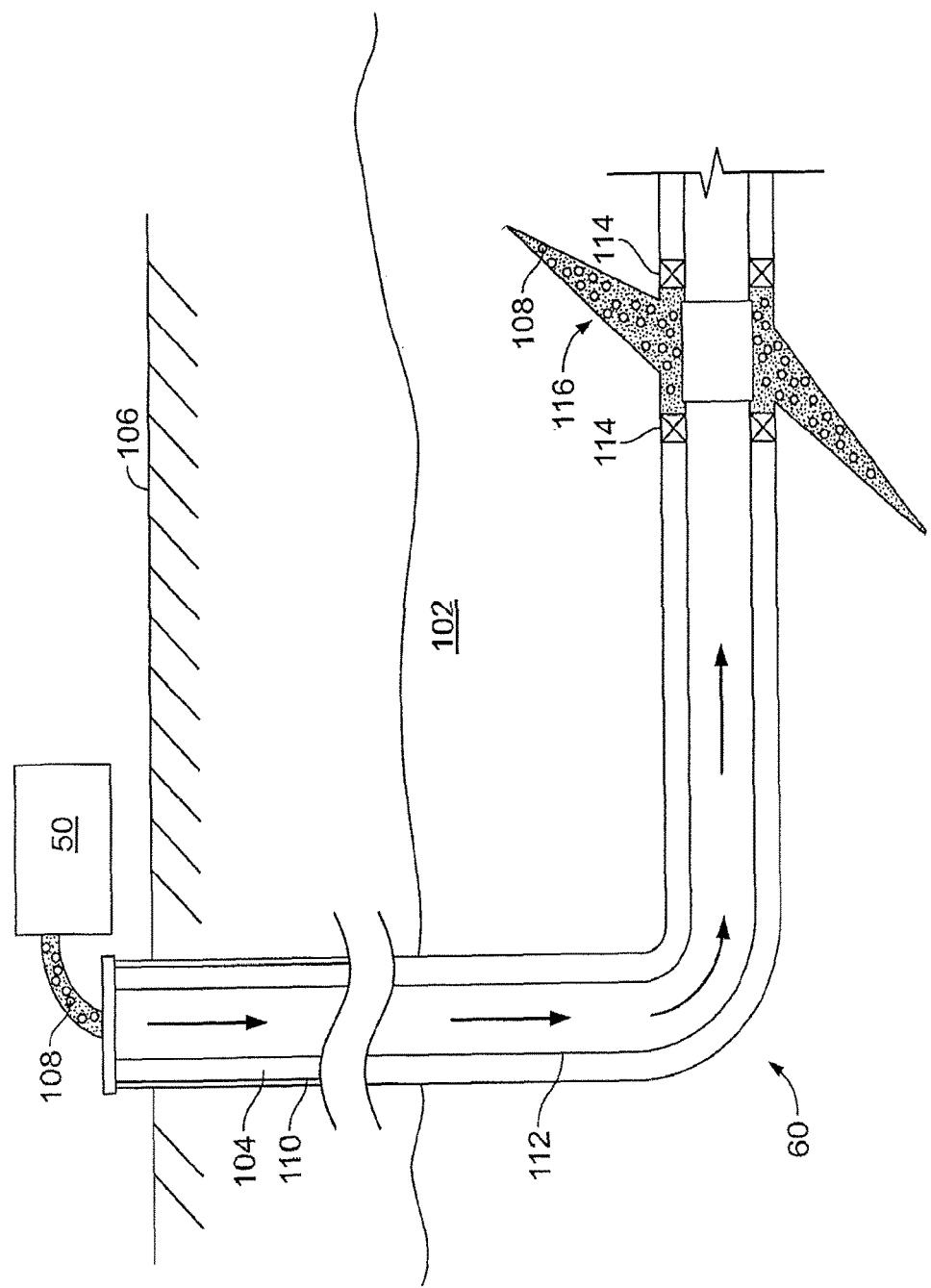
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claimed invention, which is set forth in the following claims.

What is claimed is:

1. A fracturing fluid comprising:
   a cellulose polymer derivative;
   a diol functional group; and
   a borate crosslinker,
   wherein the diol functional group is a cis-diol in a cyclic structure.

2. The fracturing fluid of claim 1 wherein the cellulose polymer derivative further comprises a hydroxyethyl group or a hydroxypropyl group.

3. The fracturing fluid of claim 1 further comprising at least one metallic crosslinker.

4. The fracturing fluid of claim 3 wherein the metallic crosslinker is selected from the group consisting of Al, Mg, Zr, Ti, Cu, Mo, and Co.

5. A method of using a fracturing fluid according to claim 1 comprises the step of:
   introducing the fracturing fluid into a subterranean formation.

6. The method of claim 5 wherein the cellulose polymer derivative further comprises a hydroxyethyl group or a hydroxypropyl group.

7. The method of claim 5 further comprising at least one metallic crosslinker.

8. The method of claim 7 wherein the metallic crosslinker is selected from the group consisting of Al, Mg, Zr, Ti, Cu, Mo, and Co.

9. The method of claim 5 further comprising the step of adding a pH adjusting agent to the fracturing fluid.

10. The method of claim 5 further comprising the step of adding at least one breaker to the fracturing fluid.

11. The method of claim 5 further comprising the step of adding a surfactant to the fracturing fluid.

12. The method of claim 5 further comprising the step of adding a scale inhibitor or a bactericide to the fracturing fluid.

13. The method of claim 5 further comprising mixing the fracturing fluid using mixing equipment.

14. The method of claim 5 wherein the fracturing fluid is introduced into a subterranean formation using one or more pumps.

* * * * *